United States Patent [19]
Uehara et al.

[11] Patent Number: 5,929,803
[45] Date of Patent: Jul. 27, 1999

[54] VEHICULAR RADAR APPARATUS

[75] Inventors: Naohisa Uehara; Masahiro Watanabe, both of Tokyo, Japan

[73] Assignee: Mitsubishi Denki Kabushiki Kaisha, Tokyo, Japan

[21] Appl. No.: 09/004,646

[22] Filed: Jan. 8, 1998

[30] Foreign Application Priority Data

Aug. 29, 1997 [JP] Japan ................................. 9-234660

[51] Int. Cl.$^6$ ............................. G01S 13/92; G01S 13/93
[52] U.S. Cl. ............................ 342/70; 342/109; 340/903; 180/169
[58] Field of Search ................................. 342/70, 71, 72, 342/109; 340/903; 701/301; 180/169

[56] References Cited

U.S. PATENT DOCUMENTS

| 5,572,428 | 11/1996 | Ishida et al. | ............................. 340/903 |
| 5,613,039 | 3/1997 | Wang et al. | ................................. 342/70 |

FOREIGN PATENT DOCUMENTS

6295400  10/1994  Japan .

*Primary Examiner*—Ian J. Lobo
*Attorney, Agent, or Firm*—Sughrue, Mion, Zinn Macpeak & Seas, PLLC

[57] ABSTRACT

Vehicular radar apparatus which enhances the accuracy of detection of a preceding vehicle and the reliability in tracking, by performing operations that use a normal distribution. For the purpose of obtaining a distance between one's own vehicle, on which the radar apparatus is mounted, and a target object, and obtaining a relative velocity from input data based on transmission and reception electromagnetic waves, this radar apparatus provided with a signal processing unit which has operation devices for performing an operation by applying normal distributions to frequencies of detection of the distance and the relative velocity and a target object recognition device for recognizing a target object on the basis of results of an operation to which the normal distributions are applied. The operation device is operative to establish a window corresponding to each target object, and obtain the frequencies of detection of the distance and the relative velocity correspondingly to each of plural data widths or sections of a probability density on a normal distribution curve, and establish a next window from data representing detected frequencies. The target object recognition device is operative to recognize target objects, each of which corresponds to a distance and a relative velocity that are within a same window, as different objects, but recognize target objects, each of which corresponds to a distance and a relative velocity that are not within a same window, as different objects as an identical object.

6 Claims, 11 Drawing Sheets

IN CASE OF INCREASING
TRANSMISSION FREQUENCY

FIG. 6

IN CASE OF DECREASING
TRANSMISSION FREQUENCY

VEHICULAR RADAR APPARATUS

BACKGROUND OF THE INVENTION

1. Field of the Invention

The present invention generally relates to a vehicular radar apparatus for measuring the distance between one's own vehicle, on which the vehicular radar apparatus is mounted, and a preceding vehicle going ahead thereof and the relative velocity (or speed) thereof on the basis of reception electromagnetic waves that are obtained by receiving transmission electromagnetic waves (for example, frequency-modulated continuous waves (FM-CW)) which are transmitted from one's own vehicle and are then reflected by a target object. More particularly, the present invention relates to a vehicular radar apparatus which enhances the accuracy of detection of a preceding vehicle and the reliability in tracking, by performing (arithmetic) operations that use a normal distribution.

2. Description of the Related Art

Hitherto, there have been proposed various vehicular radar apparatuses each for detecting the distance between one's own vehicle and a target object (namely, a preceding vehicle) and the relative velocity on the basis of transmission electromagnetic waves and reception electromagnetic waves.

Figure 20:
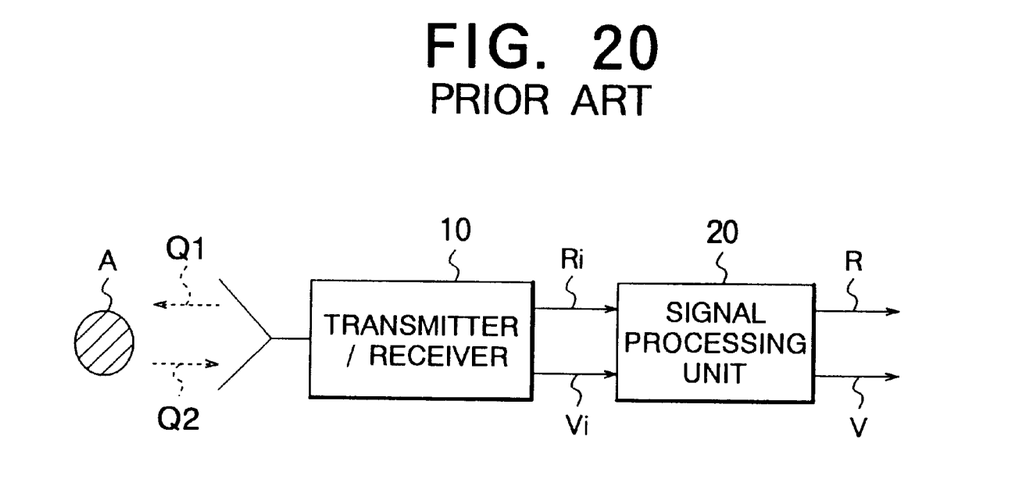
FIG. 20 is a block diagram schematically illustrating the conventional vehicular radar apparatus.

FIG. 20 is a block diagram schematically illustrating a conventional vehicular radar apparatus.

In the apparatus of FIG. 20, for the purpose of transmitting and receiving electromagnetic waves, a vehicular transmitter/receiver 10 is operative to transmit electromagnetic waves, which are generated by, for example, a laser radar or a millimeter-wave radar, as transmission electromagnetic waves Q1 and to receive waves, which are reflected from a target object A, as reception electromagnetic waves Q2.

Vehicular signal processing means 20 includes an (arithmetic) operation means, and is operative to compute the distance between one's own vehicle and the target object A and the relative velocity R on the basis of data and signals (for instance, distance data Ri and relative velocity data Vi) sent from the transmitter/receiver 10, and to obtain end results and output the obtained results to an external system.

Next, an operation of the conventional vehicular radar apparatus constructed as illustrated in FIG. 20 will be described hereinbelow.

Incidentally, the operation of the conventional apparatus as illustrated in FIG. 20 is disclosed in, for example, Japanese Unexamined Patent Publication No. 6-29540 Official Gazette.

Signal processing unit 20 is operative to estimate the range of values Rs(i+1), which are represented by the distance data at the time when a time period corresponding to a data updating period (or cycle) Δt has passed, from the following equation (1), which is expressed by using the distance data Ri and the relative velocity data Vi outputted from the transmitter/receiver 10:

$$Rs(i+1) = Ri + Vi \cdot \Delta t \pm \alpha \qquad (1)$$

When the distance data R(i+1) at the time, at which the time period corresponding to the data updating cycle Δt has passed (since a starting time), is inputted, if the value of this distance data R(i+1) is within the range of values Rs(i+1) of the distance data, it is judged that a detected object is identical with the target object A.

Incidentally, according to the aforesaid equation (1), in the case that the preceding vehicle is located at the distance Ri from one's own vehicle and has the relative velocity Vi, the signal processing unit 20 computes the distance Rs(i+1) by which the preceding vehicle moves with respect to one's own vehicle during the data updating cycle Δt.

Incidentally, the distance data Ri and the relative velocity data Vi are regarded as data or quantities which change every data updating cycle Δt. Therefore, in the equation (1), tolerance of ±α is set so as to accommodate variation in such data.

Figure 21:
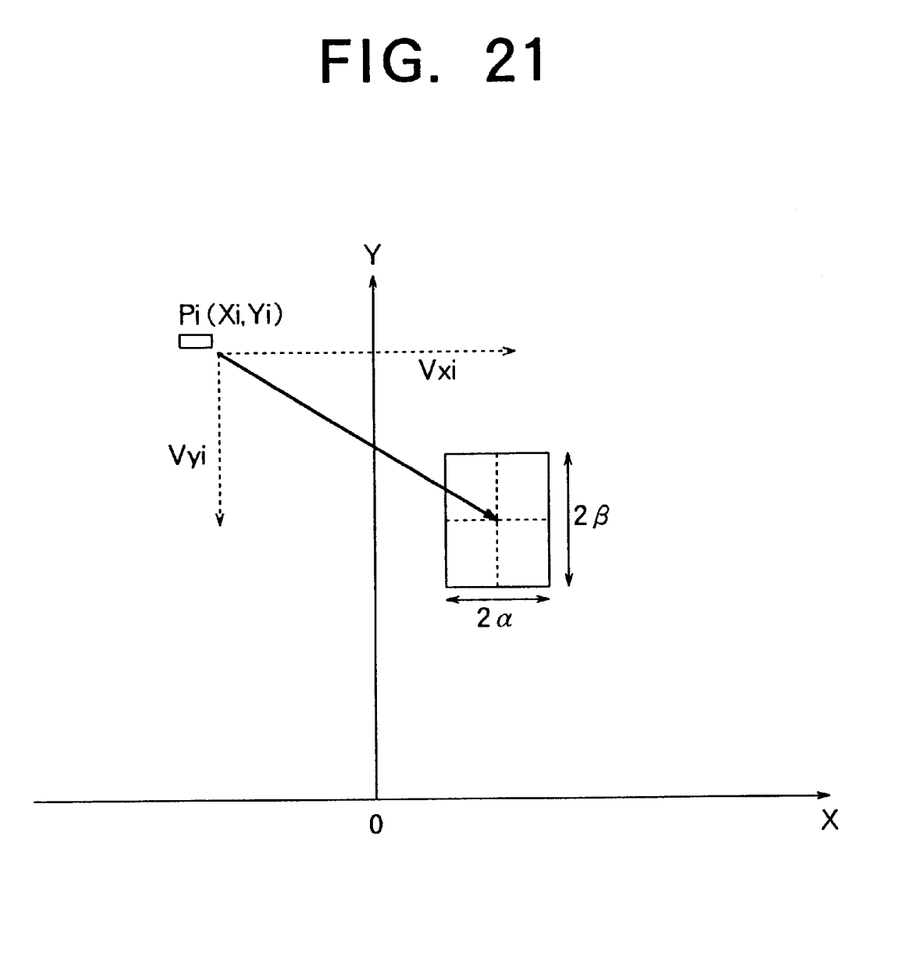
FIG. 21 is a diagram illustrating operations of calculating the distance and the relative velocity, which is performed in the conventional vehicular radar apparatus of the scanning type by using a window.

For instance, FIG. 21 is a diagram illustrating a signal processing operation of a scan radar. In FIG. 21, Y-axis represents a travelling direction in which the one's own vehicle is caused to go; Pi(Xi, Yi) the current position of the preceding vehicle; and Vxi and Vyi two-dimensional components of the relative velocity Vi(Vxi, Vyi), respectively.

In this case, the current position Pi(Xi, Yi) and the current relative velocity Vi(Vxi, Vyi) of the preceding vehicle correspondingly to the travelling direction of one's own vehicle and to a lateral direction perpendicular to the travelling direction thereof can be obtained.

Incidentally, the tolerances ±β and ±β (namely, 2α and 2β) respectively corresponding to the current position Pi(Xi, Yi) and the current relative velocity Vi(Vxi, Vyi) of the preceding vehicle, which act as data or quantities varies within the data updating cycle Δt, are established so as to accommodate variations in such data.

Thus, the aforementioned equation (1) is extended or expanded as the following equations (2) and (3), by establishing a window whose sides extending in X- and Y-directions are ±α and ±β in width and length, respectively.

$$Ys(i+1) = Yi + Vyi \cdot \Delta t \pm \alpha \qquad (2)$$

$$Xs(i+1) = Xi + Vxi \cdot \Delta t \pm \beta \qquad (3)$$

Therefore, if the values of X- and Y-components of the position data P(i+1) are within the window corresponding to the equations (2) and (3) when inputting this position data P(i+1) at the time at which the data updating period has passed, it is judged that the detected object is identical with the target object A.

It is, however, known that there is caused considerably large variation in the absolute value of sensor output data (Ri, Vi) obtained in the aforesaid conventional apparatus, because the signal level of a reception signal varies with, for instance, natural conditions, such as temperature and weather, and to running environment.

Therefore, the window range, which is determined by α and β (see the equations (2) and (3)), to be added to the right side of the aforementioned equation (1) have to be set at large values, respectively. Thus, under some running conditions, there is a fear that another target object is erroneously judged as being identical with the target object A.

Conversely, if the window range is set at a small value, namely, if the window width and length α and β are set at small values, respectively, so as to prevent the apparatus for making such an erroneous judgement, there is a fear that, even when a detected target object is identical with the object A, the detected target object A is erroneously judged as being a different object.

Namely, each of the window width and length α and β is a constant value. Thus, in the case that variation in measured data is very small, the window width and length α and β are too large to discriminate between a target object and a different object. Conversely, in the case that variation in measured data is large, the window width and length α and β are too small. Consequently, even when a detected target object is identical with the object A, the apparatus cannot judge that the detected object is identical with the target object A.

As above described, in the case of the conventional vehicular radar apparatus, a invariant window range is established. Thus, the conventional vehicular radar apparatus has the following problems. Namely, in the case where the window range is too large, namely, the width and length α and β are too large, there is a fear that different target objects are erroneously judged as being identical with each other. Conversely, in the case where the window range is small, namely, the width and length α and β are too small, there is a fear that, even in the case where a detected object is identical with a target object, the detected object is erroneously judged as being different from the target object.

The present invention is accomplished to solve the aforementioned problems of the conventional radar apparatus.

SUMMARY OF THE INVENTION

Accordingly, an object of the present invention is to obtain a vehicular radar apparatus which enhances the accuracy of detection of a preceding vehicle and the reliability in tracking, by performing (arithmetic) operations that use a normal distribution.

To achieve the foregoing object, in accordance with the present invention, there is provided a vehicular radar apparatus which is mounted on one's own vehicle and is operative to measure a distance between one's own vehicle and a target object and a relative velocity according to transmission electromagnetic waves and reception electromagnetic waves. This vehicular radar apparatus comprises transmitting/receiving means for transmitting transmission electromagnetic waves and for receiving reception electromagnetic waves reflected by the target object, and signal processing means for obtaining the distance and the relative velocity according to input data from the transmitting/receiving means. The signal processing means which has operation means for performing an operation by applying normal distributions to frequencies of detection of the distance and the relative velocity and target object recognition means for recognizing a target object on the basis of results of an operation to which the normal distributions are applied. The operation means is operative to establish a window corresponding to each target object, and obtain the frequencies of detection of the distance and the relative velocity correspondingly to each of plural data widths or sections of a probability density on a normal distribution curve, and establish a next window from data representing detected frequencies. The target object recognition means is operative to recognize target objects, each of which corresponds to a distance and a relative velocity that are within a same window, as an identical object, but recognize target objects, each of which corresponds to a distance and a relative velocity that are not within a same window, as different objects.

Thus, in accordance with the present invention, normal distributions are applied to the frequencies of detection of the distance between one's own vehicle and the target object, and the relative velocity. Further, if distance data and relative velocity data are not in the window with a probability determined on the normal distributions thereof, it is judged that an object, which is different from the target object, is detected. In contrast, if distance data and relative velocity data are within the window with the probability determined on the normal distributions thereof, it is judged that an object, which is identical with the target object, is detected.

Further, an embodiment of the vehicular radar apparatus of the present invention is further provided with a scanning mechanism for driving and causing the transmitting/receiving means to scan. The signal processing means is operative to calculate the distance and the relative velocity correspondingly to each detection point which corresponds to a target object within a scanning range to be scanned by using the scanning mechanism.

Moreover, in the case of another embodiment of the vehicular radar apparatus of the present invention, the transmission electromagnetic waves to be transmitted from the transmitting/receiving means are FM-CW waves. Furthermore, the transmitting/receiving means includes a mixer for generating a beat signal according to the transmission electromagnetic wave and the reception electromagnetic wave. The signal processing means is operative to calculate the distance and the relative velocity according to the beat signal.

Additionally, in the case of still another embodiment of the vehicular radar apparatus of the present invention, the operation means provided in the signal processing means is operative to set what is called a "data width" (namely, the width of each cell of a histogram) corresponding to resolution of each of the distance and the relative velocity as a window (width), and to calculate a mean (or average) value and a standard deviation, which correspond to a normal distribution curve, according to a histogram of a detection frequency corresponding to each data width, and to set a data width in a variable manner according to the mean value and the standard deviation.

Moreover, yet an embodiment of the vehicular radar apparatus of the present invention is further provided with a control unit for causing one's own vehicle to follow the target object. The control unit causes one's own vehicle in response to a result of recognition, which is made by the target object recognition means provided in the signal processing means, to follow the target object.

Furthermore, in the case of still another embodiment of the vehicular radar apparatus of the present invention, the target object recognition means is operative to recognize the preceding vehicle from the target object.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF THE PREFERRED EMBODIMENTS

Hereinafter, preferred embodiments of the present invention will be described in detail by referring to the accompanying drawings.

Embodiment 1

Hereunder, "Embodiment 1" of the present invention will be described with reference to the accompanying drawings.

Figure 1:
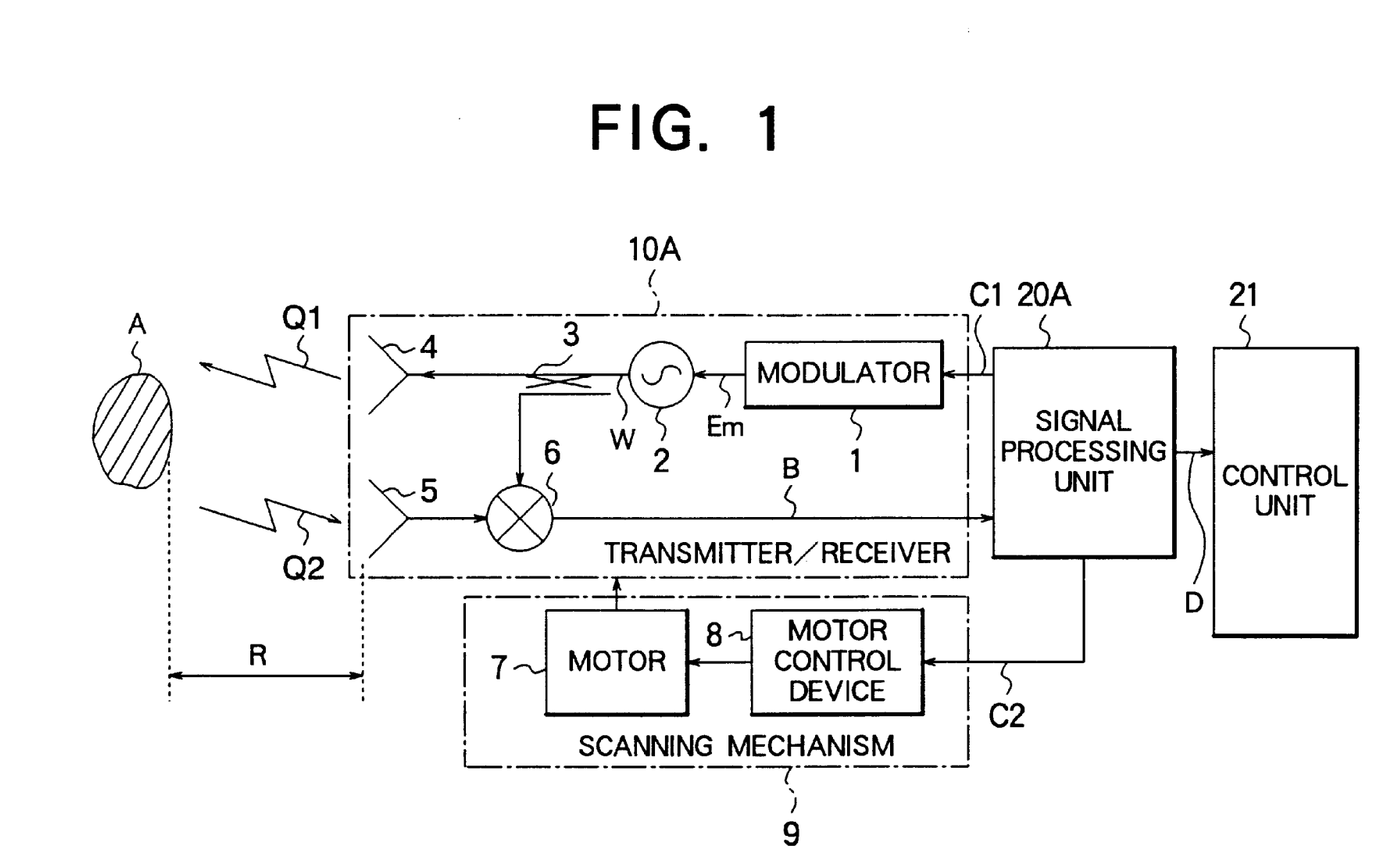
FIG. 1 is a block diagram illustrating "Embodiment 1" of the present invention.

FIG. 1 is a block diagram illustrating the configuration of "Embodiment 1" of the present invention. In the apparatus of FIG. 1, a transmitter/receiver 10A and a signal processing unit 20A correspond to the aforementioned transmitter/receiver 10 and the aforesaid signal processing unit 20 (see FIG. 20), respectively. Target object A is similar to the aforementioned target object.

Transmitter/receiver 10A is provided with a modulator 1 which is operative to output a voltage signal Em for frequency modulation (FM), a voltage controlled oscillator 2 which is operative to output FM electromagnetic waves Q that is frequency-modulated by a voltage signal Em, and a directional coupler (hereunder referred to as a power divider) 3 which is operative to output FM electromagnetic waves in two directions, and a transmitting antenna 4 for emitting the FM electromagnetic waves Q as transmission electromagnetic waves Q1.

Further, the transmitter/receiver 10A is provided with a receiving antenna 5 for receiving waves reflected from the target object A as reception electromagnetic waves Q2, and a mixer 6 for generating beat signals B by mixing FM electromagnetic wave Q, which corresponds to a transmission electromagnetic wave Q1, with a reception electromagnetic wave Q2.

Modulator 1 provided in the transmitter/receiver 10A is driven in accordance with a control signal C1 sent from the signal processing unit 20A. Beat signal B generated by the mixer 6, which is provided in the transmitter/receiver 10A, is inputted to the signal processing unit 20A.

Signal processing unit 20A includes a target object judging means for receiving the beat signal B as input data, for performing various operations on the beat signal B and for making a judgement on a preceding vehicle from the target object A.

For the purpose of driving and causing the transmitter/receiver 10A to scan, a scanning mechanism 9 is provided with a motor 7 for rotating the transmitter/receiver 10A so as to perform scanning, and a motor control device 8 for controlling the revolution of the motor 7.

Motor control device 8 provided in the scanning mechanism 9 is driven according to a control signal C2 sent from the signal processing unit 20A.

Control unit 21 causes one's own vehicle, on which it is mounted, to follow a target in response to results D of operations performed in the signal processing unit 20A.

Next, an operation of "Embodiment 1" of the present invention, which is illustrated in FIG. 1, by referring to waveform charts of FIGS. 2 to 6.

Figure 2:
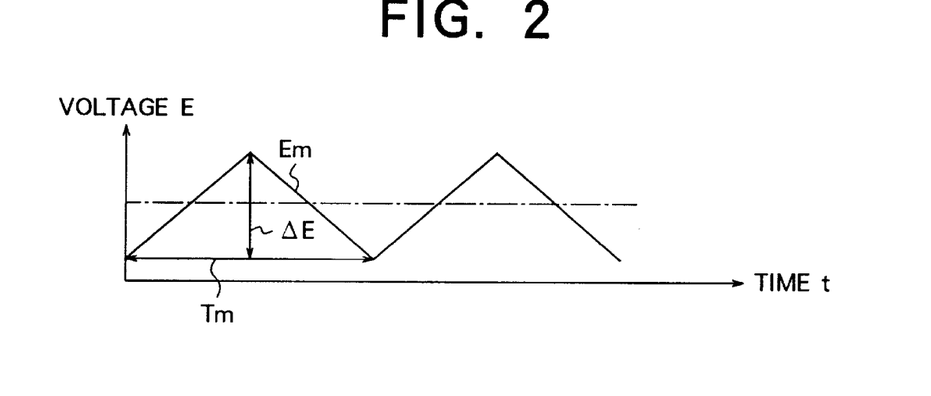
FIG. 2 is a waveform chart showing a voltage signal outputted from a modulator of "Embodiment 1" of the present invention.
Figure 3:
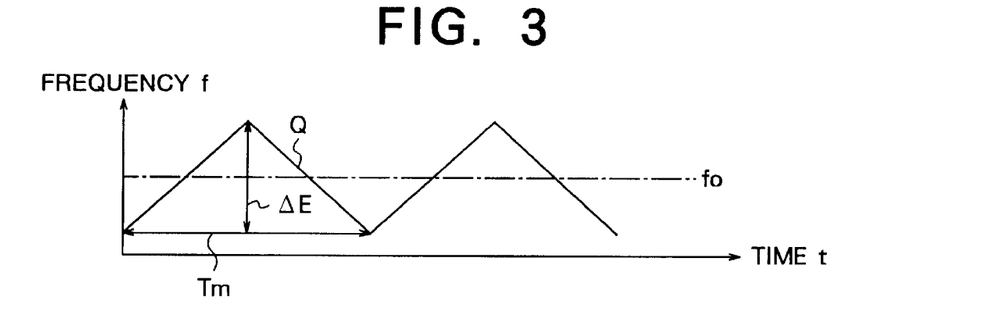
FIG. 3 is a waveform chart showing electromagnetic waves outputted from a voltage controlled oscillator of "Embodiment 1" of the present invention.
Figure 4:
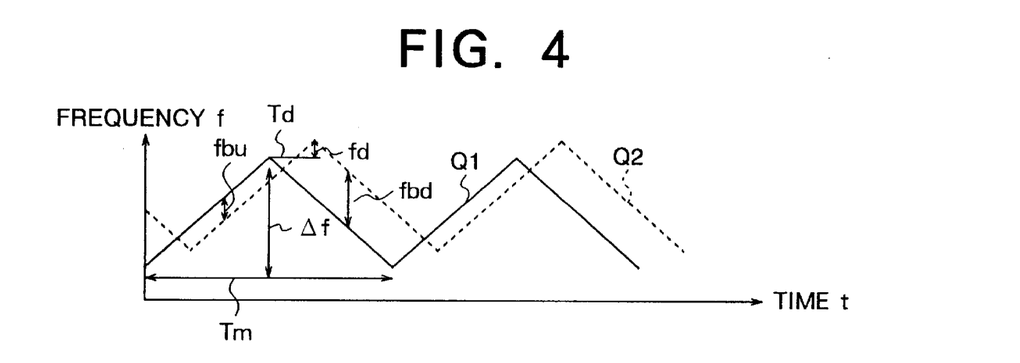
FIG. 4 is a waveform chart showing a transmission electromagnetic wave and a reception electromagnetic wave used in "Embodiment 1" of the present invention.

FIGS. 2 to 4 are waveform charts respectively showing a voltage signal Em, FM electromagnetic wave Q, and a set of transmission and reception electromagnetic waves (Q1, Q2). In these waveform charts, abscissas denote time t; and ordinates represent frequencies f.

In FIG. 3, the center (or mean) frequency $f_0$ is the fundamental frequency of a carrier wave for FM electromagnetic wave Q (namely, a transmission electromagnetic wave Q2) and is set at 60 GHz or so.

Figure 5:
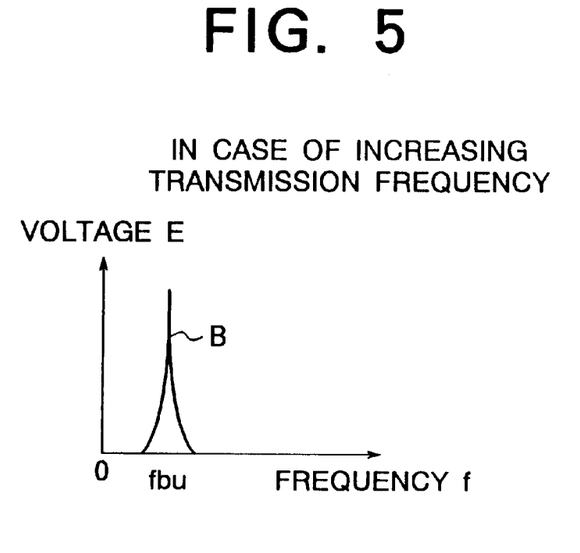
FIG. 5 is a waveform chart showing a beat signal generated in "Embodiment 1" of the present invention when increasing a transmission frequency.
Figure 6:
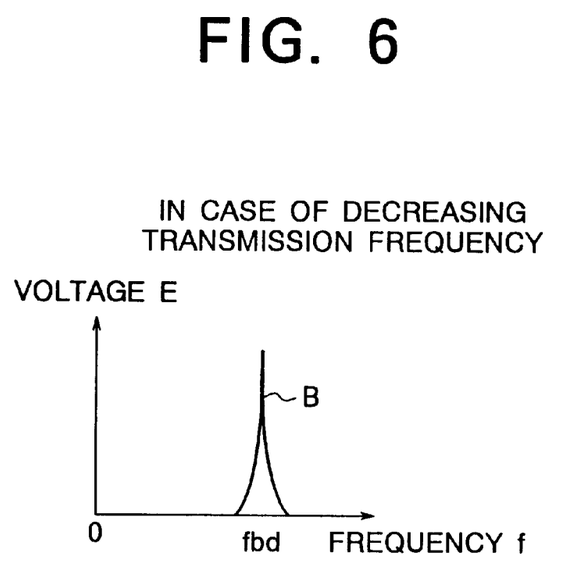
FIG. 6 is a waveform chart showing a beat signal generated in "Embodiment 1" of the present invention when decreasing a transmission frequency.

Further, FIGS. 5 and 6 are waveform charts illustrating beat signals B in the cases that a transmission frequency is increased and that the transmission frequency is decreased, respectively. Incidentally, abscissas denote time t; and ordinates represent voltages E.

First, the modulator 1 outputs a linear voltage signal Em having a voltage width ΔE and a modulation period (or cycle) Tm as illustrated in FIG. 2.

Further, in response to a voltage signal Em (see FIG. 2), the voltage controlled oscillator 2 outputs FM electromagnetic wave Q which has a frequency sweeping band width Δf and a modulation period Tm as illustrated in FIG. 3.

FM electromagnetic wave Q is divided by the power divider 3 into two waves, one of which is inputted to the transmitting antenna 4, and the other of which is inputted to the mixer 6.

FM electromagnetic wave Q inputted to the transmitting antenna 4 is then emitted therefrom to the space as a transmission electromagnetic wave Q1.

Subsequently, the transmission electromagnetic wave Q1 is reflected by the target object A, which is present at a distance R from one's own vehicle, and is received by the receiving antenna 5 as the reception electromagnetic wave Q2.

At that time, as indicated by dashed lines in FIG. 4, the reception electromagnetic wave Q2 has a delay time Td depending upon the distance R with respect to the transmission electromagnetic wave Q1 (indicated by solid lines therein).

Further, in the case that the target object A has a relative velocity V relative to one's own vehicle, the reception electromagnetic wave Q2 is shifted in the direction of the frequency f by Doppler shift fd as illustrated in FIG. 4.

Subsequently, the mixer 6 mixes the received reception electromagnetic wave Q2 with the transmission electromagnetic wave Q1 sent from the power divider 3, and outputs beat signals B corresponding to the delay time Td and Doppler shift fd, as shown in FIGS. 5 and 6.

At that time, the beat frequency of the beat signal B has a relative low value fbu (see FIG. 5) in the case that the transmission frequency of the transmission electromagnetic wave Q1 increases, whereas the beat frequency of the beat signal B has a relatively high value fbd (see FIG. 6) in the case that the transmission frequency of the transmission electromagnetic wave Q1 decreases.

Finally, the signal processing unit 20A calculates the distance R from one's own vehicle to the target object A, and the relative velocity V therebetween. Moreover, the signal processing unit 20A performs the recognition of a preceding vehicle from the detected target object A. In addition, the signal processing unit 20A computes the distance therefrom to the preceding vehicle and the relative velocity according to a result D of the recognition of the preceding vehicle, and thereafter outputs a result of this computation to the control unit 21 for following (a preceding vehicle or the like), together with the result D of the recognition.

Next, operations of calculation of the distance and the relative velocity by the signal processing unit 20A will be described hereinbelow.

Namely, the signal processing unit 20A obtains the distance R between one's own vehicle and the target object A, and the relative velocity V according to the following equations (4) and (5) by using the frequencies fbu and fbd of the beat signal B.

$$R = Tm \cdot C(fbu + fbd)/8 \cdot \Delta f \quad (4)$$

$$V = \lambda(fbu - fbd)/4 \quad (5)$$

Incidentally, in the equations (4) and (5), Tm designates the modulation period of the voltage signal Em; $\Delta f$ a frequency sweeping band width; C the velocity of light (=$3.0 \times 10^8$ m/sec); and $\lambda$ the wavelength of a carrier wave for the transmission electromagnetic wave Q1. Further, if the center frequency fo is 60 GHz, the wavelength $\lambda$ is $5.0 \times 10^{-3}$ m.

Moreover, in the case that a plurality of target objects A are present in front of one's own vehicle, the beat frequency fbu and fbd of a same object are extracted from a plurality of frequency differences fbu (namely, beat frequencies) between the transmission electromagnetic wave Q1 and the reception electromagnetic wave Q2 in the case that the frequency increases, and a plurality of frequency differences fbd (namely, beat frequencies) between the transmission electromagnetic wave Q1 and the reception electromagnetic wave Q2 in the case that the frequency decreases. Then, the distance R and the relative velocity V are obtained by using the equations (4) and (5).

Hereunder, a preceding-vehicle recognition operation of this "Embodiment 1" of the present invention will be described with reference to a flowchart of FIG. 7 and histograms of FIGS. 8(*a*) to 9(*b*).

Figure 7:
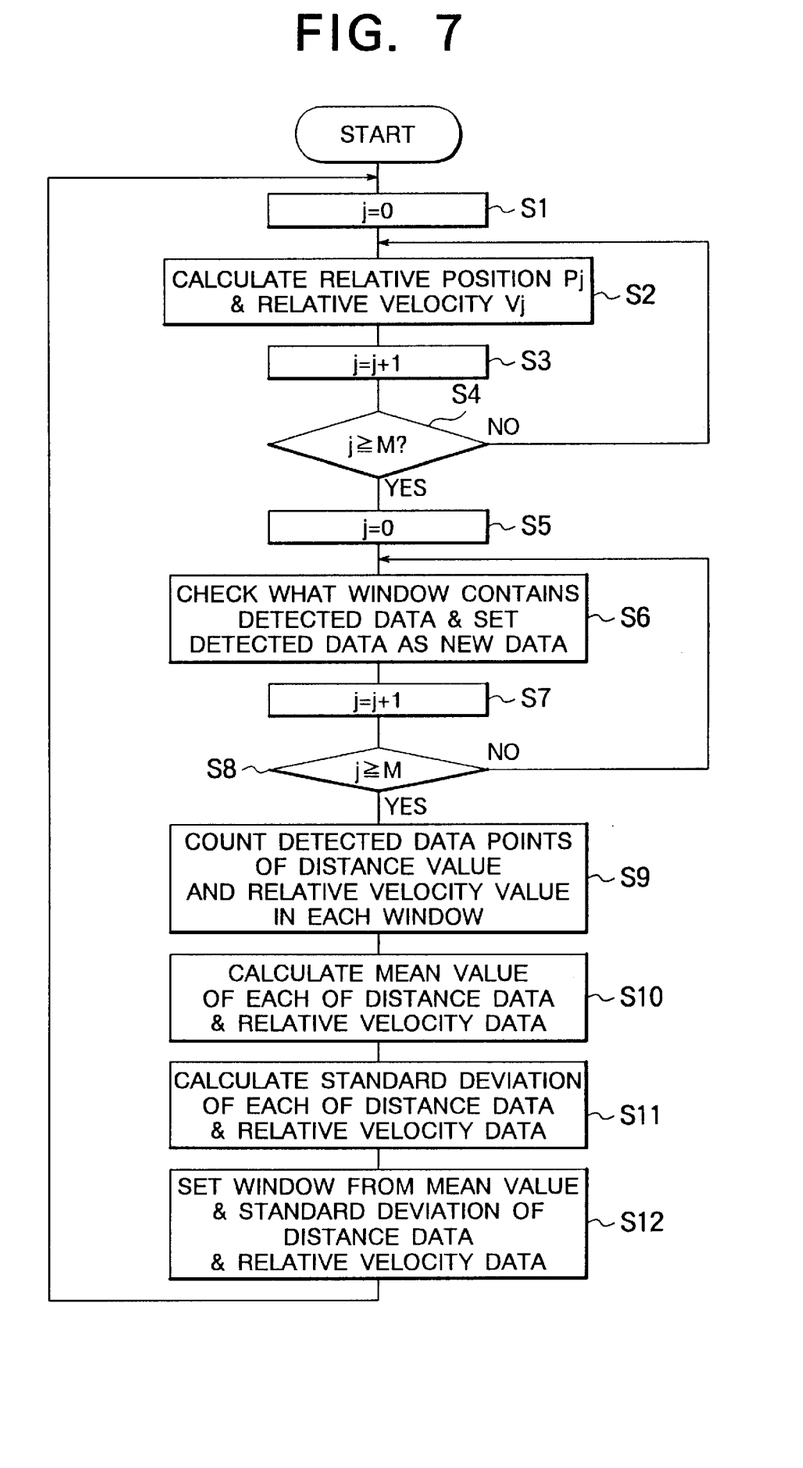
FIG. 7 is a flowchart for illustrating a control operation of "Embodiment 1" of the present invention, which is performed according to window processing.

As shown in FIG. 7, the signal processing unit 20A first resets a variable j, which is used for counting data, to 0 in step S1. Then, the relative position Pj (corresponding to the coordinates Pxj nd Pyj obtained by adding angular information to the distance Rj) and the relative velocity Vj are calculated (step S2). Thereafter, the variable j is incremented (in step S3). Further, it is judged whether or not the variable j reaches a predetermined value M corresponding to the number of all of detection points (in step S4).

If it is judged that j<M (namely, judged as NO), this apparatus returns to step S2 and thence data calculation operation is repeatedly performed on the next detection points.

Thus, an operation of inputting the relative positions Pj(Xj, Yj) and the relative velocities Vj(Vxj, Vyj) of all detection points is finished. Then, if it is judged in step S4 that j≧M (namely, judged as YES), this apparatus advances to the next window processing to be performed the next time.

First, the variable j is cleared again to 0 (in step S5). Then, it is judged which of windows established one period ago contains one detection point. If none of such windows contain this detection point, current data on the detection points are registered as new data (in step S6) so as to establish the next windows to be used the next time, correspondingly to the current detected data.

In step S6, it is judged what window contains data representing the relative position Pj and the relative velocity Vj, respectively.

Incidentally, each window is established in order to recognize whether or not the last(-time) and current data representing a group of detection points corresponding to each target object A indicate a same object. Further, each window is updated correspondingly to each of the recognized target objects A, every time when an (arithmetic) operation is performed.

Subsequently, the variable j is incremented (in step S7). Then, it is judged (in step S8) whether or not the variable j reaches the predetermined value M. If it is judged that j<M (namely, NO), this apparatus returns to step S6. Thereafter, a window discrimination operation on the next detection point is repeatedly performed.

Thus, the window discrimination operation to be performed on all of detection points is finished. If it is judged in step S8 that j≧M (namely, YES), this apparatus advances to a step of performing a variable window setting operation based on the following statistical processing.

First, detection points, which are present in each established window, are counted, namely, the number Ni of detection points is measured as data correspondingly to each set of the distance Rj and the relative velocity Vj. Moreover, as illustrated in FIGS. 8(*a*) to 9(*b*), the histograms representing the relation between the detection number Ni (namely, the detection frequency) and data value of each of the detection points are obtained (in step S9).

Figure 8A:
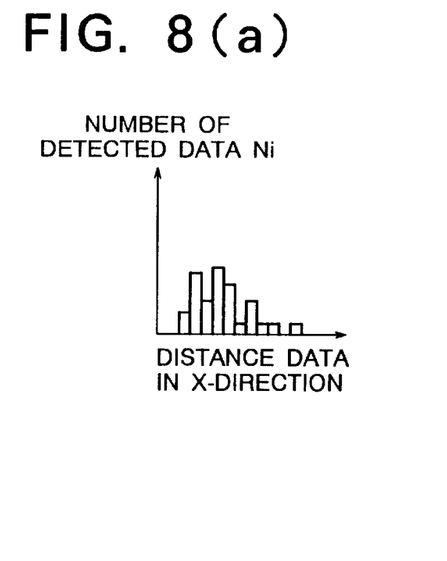
FIGS. 8(a) and 8(b) are histograms each illustrating the numbers of detection points of distance data (namely, the detection frequencies of distance data)
Figure 8B:
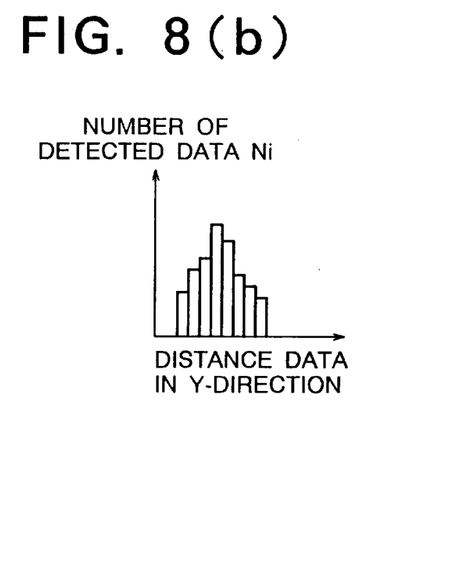
Figure 9A:
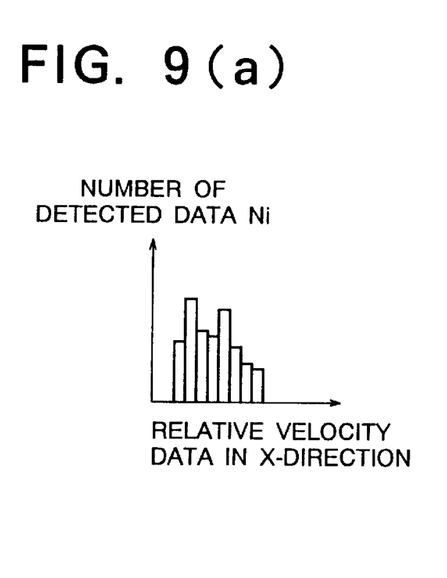
FIGS. 9(a) and 9(b) are histograms obtained in step S9 of FIG. 7, each of which illustrates the numbers of detection points of relative velocity data (namely, the detection frequencies of relative velocity data)
Figure 9B:
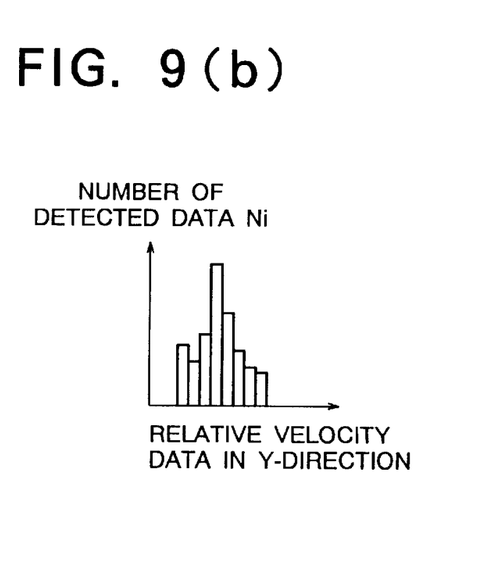

FIG. 8(*a*) and 8(*b*) show the distribution of the distance data; and FIGS. 9(*a*) and 9(*b*) show the distribution of the relative velocity data. Each of FIGS. 8(*a*) and 9(*a*) illustrates the distribution of the corresponding data in X-direction (namely, a direction perpendicular to the travelling direction in which one's own vehicle is caused to go). Each of FIGS. 8(*b*) and 9(*b*) shows the distribution of the corresponding data in Y-direction (namely, the travelling direction in which one's own vehicle is caused to go).

Furthermore, the width of the number data (namely, the width of each rectangle cell) of each of the histograms of FIGS. 8(*a*) to 9(*b*) corresponds to a corresponding one of distance resolution and velocity resolution which are 1 m and 1 km/h, respectively.

Next, the mean value Pjm of the relative positions Pj and the mean value Vjm of the relative velocities are calculated (in step S10).

Mean values Pjm and Vjm are obtained from the following equations (6) and (7):

$$Pjm = \Sigma\{Ni \cdot Pj(i)\}/N \quad (6)$$

$$Vjm = \Sigma\{Ni \cdot Vj(i)\}/N \quad (7)$$

Incidentally, in the equations (6) and (7), Ni designates the number of detection points in the case of each detection distance; and N a total number of points detected in a window.

Furthermore, in the case of the equation (6), the summation ($\Sigma$) of $\{Ni \cdot Pj(i)\}/N$ is computed from i=0 to i=Pmax. Additionally, in the case of the equation (7), the summation ($\Sigma$) of $\{Ni \cdot Vj(i)\}/N$ is calculated from i=0 to i=Vmax. Incidentally, Pmax and Vmax are the maximum value of the measurable relative positions Pj and the maximum value of the measurable relative velocities Vj, respectively.

Next, the standard deviations σPj and σVj of the relative position Pj and the relative velocities Vj are calculated by using the aforesaid mean values Pjm and Vjm (in step S11).

Standard deviations σPj and σVj are obtained by the following equations (8) and (9), respectively:

$$\sigma Pj = \sqrt{[\Sigma\{Ni \cdot Pj(i)^2 - Pjm^2\}/N]} \quad (8)$$

$$\sigma Vj = \sqrt{[\Sigma\{Ni \cdot Vj(i)^2 - Vjm^2\}/N]} \quad (9)$$

Incidentally, in the equations (8) and (9), Ni, N, Pmax and Vmax designate the same quantities as above described. In the equation (8), the summation ($\Sigma$) of $\{Ni \cdot Pj(i)^2 - Pjm^2\}/N$ is computed from i=0 to i=Pmax. Additionally, in the case of the equation (9), the summation ($\Sigma$) of $\{Ni \cdot Vj(i)^2 - Vjm^2\}/N$ is computed from i=0 to i=Vmax.

Finally, a window corresponding to the detected data is variably set (in step S12) by using the mean value Pjm and the standard deviation σPj of the relative positions Pj and the mean value Vjm and the standard deviation σVj of the relative velocities Vj, which are obtained by the equations (6) to (9) in the aforementioned steps S10 and S11.

Incidentally, in the case that a detection period (or cycle) is equal to the data updating period Δt, X-coordinates Wx1 and Wx2 (incidentally, a rightward direction is a positive sense in the drawing) of the left and right sides of the set window and Y-coordinates Wy1 and Wy2 of the front and rear thereof are represented by the following equations (10) to (13) by using X- and Y-(component) coordinates of the mean values Pjm and Vjm and the standard deviations σPj and σVj:

$$Wx1 = Xjm - 2\sigma \cdot Xj + (Vxjm - 2\sigma \cdot Vxj)\Delta t \quad (10)$$

$$Wx2 = Xjm + 2\sigma \cdot Xj + (Vxjm + 2\sigma \cdot Vxj)\Delta t \quad (11)$$

$$Wy1 = Yjm - 2\sigma \cdot Yj + (Vyjm - 2\sigma \cdot Vyj)\Delta t \quad (12)$$

$$Wy2 = Yjm + 2\sigma \cdot Yj + (Vyjm + 2\sigma \cdot Vyj)\Delta t \quad (13)$$

Thus, when the window setting operation (in step S12) is finished, this apparatus returns to step S1 and performs the herein-above-mentioned operation repeatedly.

Hereinafter, the statistical data processing in step S12 will be concretely described by referring to FIG. 10.

Figure 10:
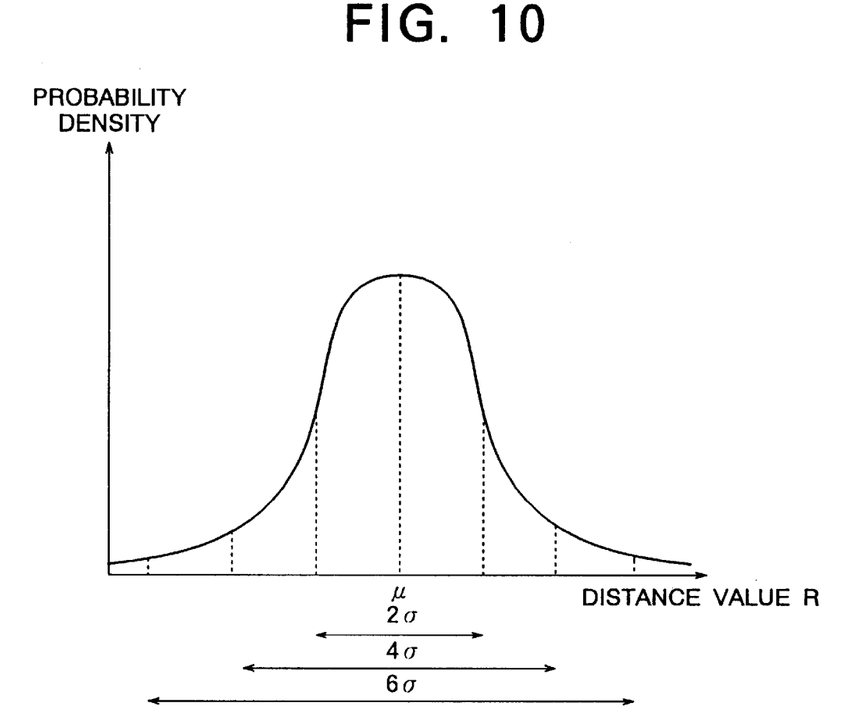
FIG. 10 is a graph illustrating the concept of a normal distribution used in "Embodiment 1" of the present invention.

FIG. 10 is a diagram illustrating a normal distribution curve. Further, abscissas designate a distance value R; and ordinates represent a probability density.

In FIG. 10, let $\mu$ and σ designate the mean value of a normal distribution and the standard deviation, respectively. In this case, as is well known, the probability, with which data is included in a range (or interval) between ($\mu-\sigma$) and ($\mu+\sigma$), is 68.2%. Further, the probability, with which data is included in a range between ($\mu-2\sigma$) and ($\mu+2\sigma$), is 95.5%. Moreover, the probability, with which data is included in a range ($\mu-3\sigma$) and ($\mu+3\sigma$), is 99.7%.

In the case of the herein-above-mentioned "Embodiment 1", as is apparent from the equations (10) to (13), the window is set in the range between ($\mu-2\sigma$) and ($\mu+2\sigma$). Thus, it is understood that the detected data is included in the set window, namely, in the range between ($\mu-2\sigma$) and ($\mu+2\sigma$), with the probability of 95% or more.

Further, among the vehicular radar apparatuses, there is caused variation in measured data owing to the individual difference thereamong, the natural environment or the running conditions. Thus, there is a fear that the normal distribution curve of FIG. 10 representing the probability density may vary in a direction in which the shape of the curve becomes broader, or in a direction in which the shape thereof becomes narrower.

However, in the case of the aforesaid "Embodiment 1", a window is set according to the standard deviation σ. Thus, even when the shape of the normal distribution curve varies owing to variation in measured data, there can be maintained uniform probability that detected data falls within the window.

Thus, if the normal distribution is applied to the frequencies of the distance R to the object and of the relative velocity V thereof, and if the detection points falls within the established section or interval (namely, within the set window), it can be judged that the detected object is identical with the target object.

Moreover, a preceding vehicle being closest to one's own vehicle can be recognized from data on the lateral width and the amplitude level of a group of the points detected in a window and on an auxiliary sensor (namely, a camera (not shown)).

Namely, the normal distribution as illustrated in FIG. 10 is applied to the setting of a window. Further, when variation in detected data is large, the widow is set at a large size. In contrast, when the variation in the detected data is small, the window is set at a small size. Thus, there can be maintained constant probability that the detected data falls within the window. Thereby, the accuracy of a result D of recognition of a preceding vehicle can be enhanced. Consequently, the reliability in the detection can be improved.

Furthermore, the reliability of the control unit 21 for causing one's own vehicle to follow a preceding vehicle or the like can be improved by securely recognizing the preceding vehicle and by obtaining a high-precision recognition result from a target object A detected in front of one's own vehicle.

Next, a data processing operation of "Embodiment 1" of the present invention will be more practically described hereunder by referring to FIGS. 11 to 19.

Figure 11:
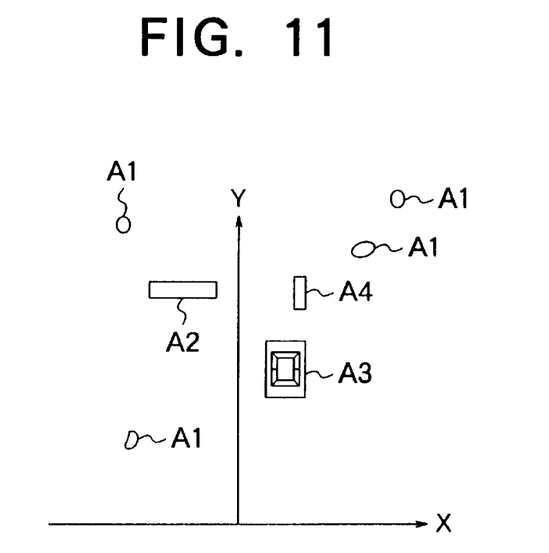
FIGS. 11, 12, 13, 14, 15(a), 15(b), 16(a), 16(b), 17(a), 17(b), 18(a), 18(b), 19(a) and 19(b) are diagrams illustrating a window setting operation to be performed in "Embodiment 1" of the present invention.

FIG. 11 shows an example of each of target objects A1 to A4 to be detected in X-Y coordinate system in front of one's own vehicle while running. For instance, the target object A1 is trees scattered on the left and right sides of a running road. Target object A2 is a signboard disposed on the running road. Target object A3 is a preceding vehicle which is located just in front of one's own vehicle. Target object A4 is a preceding autobike which goes ahead of one's own vehicle.

Figure 12:
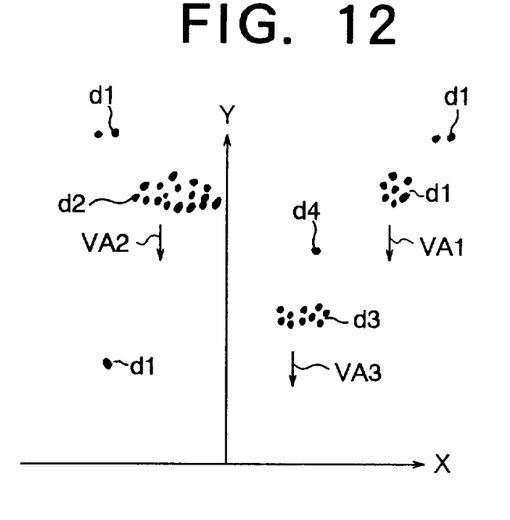

FIG. 12 illustrates detection points d1 to d4 respectively corresponding to the target objects A1 to A4 that are recognized by the vehicular radar apparatus (see FIG. 1). For example, the detection point d1 corresponding to the target object A1 (tree) moves at a relative velocity VA1. Further, the detection point d2 of the target object 2 (signboard). Detection point d2 corresponding to the target object A2 (signboard) moves at a relative velocity VA2. Target object A3 (the preceding vehicle) moves at a relative velocity.

As above stated, in the case of a scan radar apparatus, regarding each of the target objects A1 to A4, the distance thereto, the relative velocity and an angle are obtained in X-Y coordinate system are obtained. Each of target objects A1 to A4. Target object A1 to A4 has various widths (or sizes), respectively. Moreover, correspondingly to the target objects A1 to A4, there is variation in distance data value (or size) and relative velocity value.

Furthermore, one target object is usually recognized as a set of data. However, sometimes, a target object may be divided into a plurality of pieces which are recognized.

Figure 13:
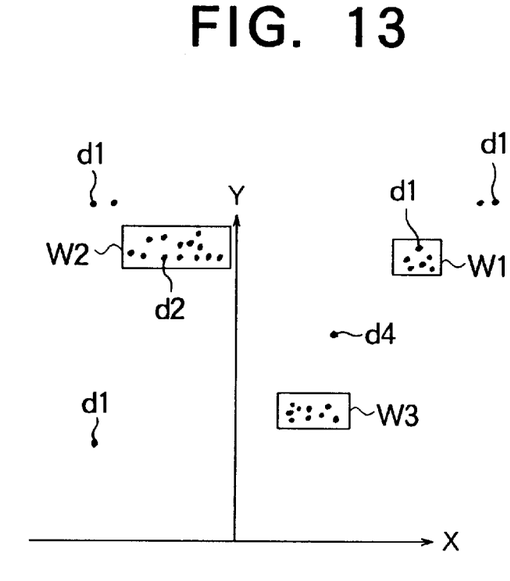

FIG. 13 show windows W1 to W3 having been already set from the last data obtained the last time correspondingly to the target objects A1 (trees), A2 (a signboard) and A3 (a preceding vehicle). Each of detection points d1 to d3 is located in a corresponding one of the window W1 to W3.

Figure 14:
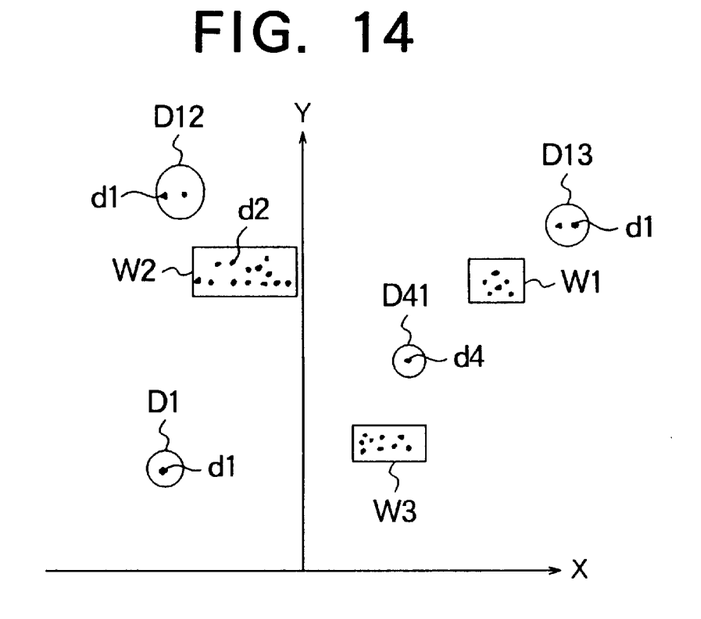

FIG. 14 illustrates new data groups, the windows corresponding to which have not been established the last time. This figure shows a state in which new data groups D11 to D13 corresponding to the detection point d1 of the trees are recognized, and in which new data group D41 corresponding to the detection point d4 of the auto-bike is recognized.

FIGS. 15(a) to 16(b) illustrate examples of histograms relating to the window W2 which corresponds to the target object A3 (namely, the preceding vehicle).

Figure 15A:
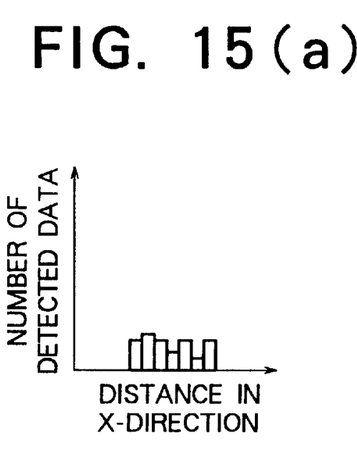
Figure 15B:
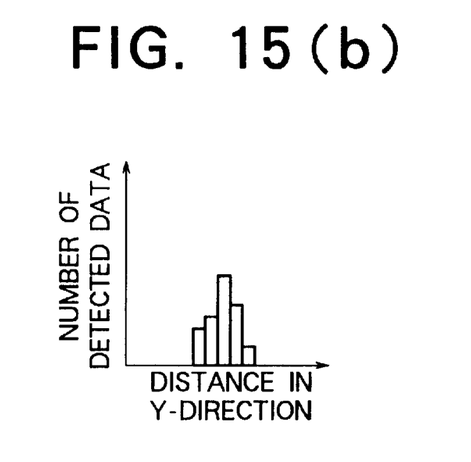
Figure 16A:
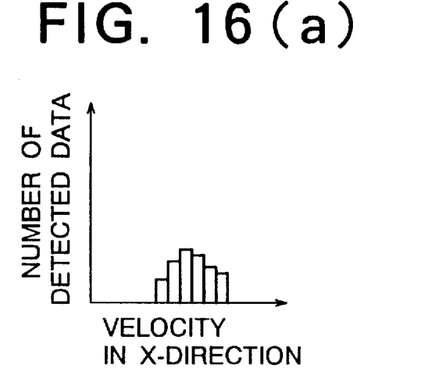
Figure 16B:
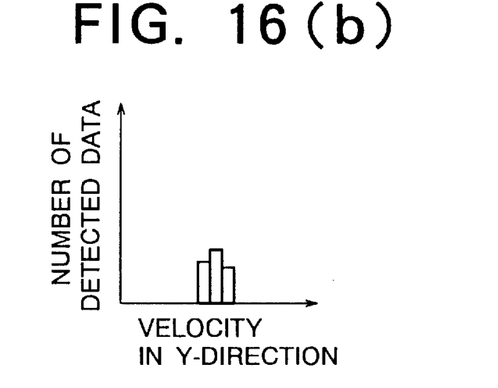

FIGS. 15(a) and 15(b) are histograms illustrating the relation between the number of detected data and the distance (or width) in X-direction of the detection point d2 included in the window W2 and the relation between the number of detected data and the distance in Y-direction of the detection point d2 included in the window W2, respectively. FIGS. 16(a) and 16(b) are histograms illustrating the relation between the number of detected data and the relative velocity in X-direction of the detection point d2 included in the window W2 and the relation between the number of detected data and the relative velocity in Y-direction of the detection point d2 included in the window W2, respectively.

Figure 17A:
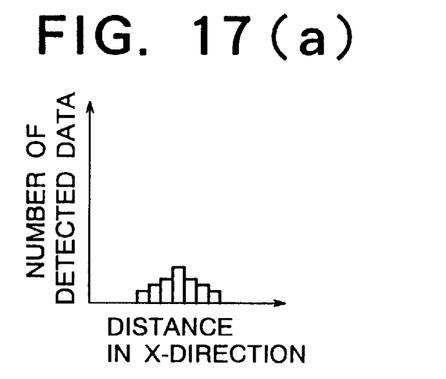
Figure 17B:
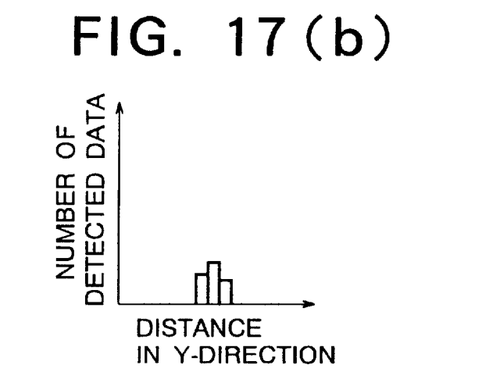
Figure 18A:
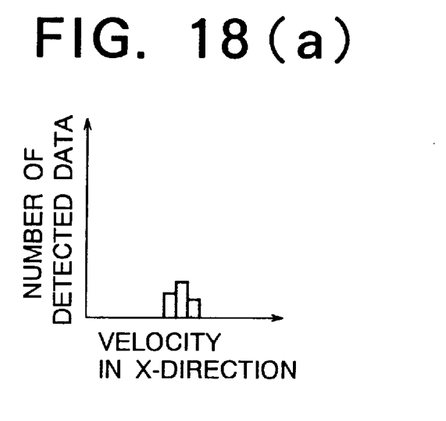
Figure 18B:
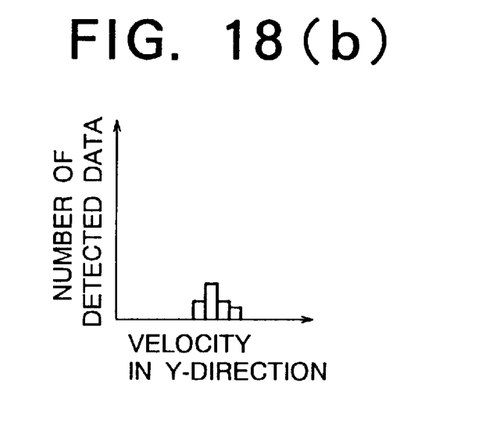

Further, FIGS. 17(a) to 18(b) illustrate examples of histograms the window W3 which corresponds to the target object A2 (namely, the preceding vehicle). FIGS. 17(a) and 17(b) are histograms illustrating the relation between the number of detected data and the distance (or width) in X-direction of the detection point d3 contained in the window W3 and the relation between the number of detected data and the distance in Y-direction of the detection point d3 contained in the window W3, respectively. FIGS. 16(a) and 16(b) are histograms illustrating the relation between the number of detected data and the relative velocity in X-direction of the detection point d2 and the relation between the number of detected data and the relative velocity in Y-direction of the detection point d2, respectively.

Figure 19:
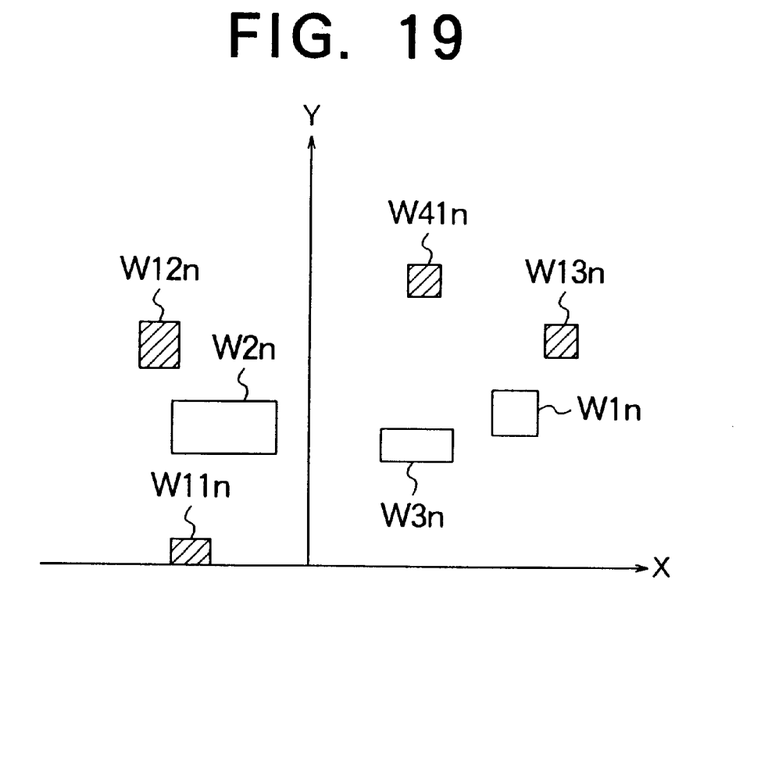

FIG. 19 illustrates the positions and sizes of the next windows W1n to W3n, W11n to W13n and W41n which are obtained by setting and updating on the basis of the aforementioned equations (10) to (13).

The next windows are updated and set according to the mean values and standard deviations of X-direction distance (or width), Y-direction distance, X-direction velocity and Y-direction velocity that are calculated on the basis of the current detection points d1 and d4 correspondingly to each window.

Consequently, the probability, with which detection points of a same target object falls into a new window, can be made to be constant or uniform.

For example, a new window W3n corresponding to the target object A3 (namely, the preceding vehicle) is shifted to the front relative to the target object A1 which stands still.

Moreover, windows W11n to W13n and W41n are newly set correspondingly to data groups which are newly recognized.

Embodiment 2

Incidentally, in the aforementioned "Embodiment 1", only the mean values Pjm and Vjm and the standard deviations σPj and σvj are used when resetting windows (or window frames) corresponding to all of the relative positions Pj(Xj, Yj) and the relative velocities Vj(vxj, Vyj) to be included in windows. However, instead, the past data measured when forming the past windows may be used.

Further, the next windows may be set by using the standard deviation of data used for following a preceding vehicle.

Embodiment 3

Moreover, in the foregoing description, there has been described the case where the vehicular radar apparatus is a scan radar apparatus. Needless to say, another radar apparatus other than the scan radar apparatus can have similar advantageous effects.

Additionally, the standard deviation may be learned at shipment so as to accommodate the individual difference among sensor devices provided in the vehicular radar apparatus.

Although preferred embodiments of the present invention have been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. A vehicular radar apparatus, mounted on a vehicle, for measuring a distance between the vehicle and a target object and a relative velocity according to transmission electromagnetic waves and reception electromagnetic waves, comprising:

transmitting/receiving means for transmitting transmission electromagnetic waves and for receiving reception electromagnetic waves reflected by said target object; and signal processing means for obtaining the distance and the relative velocity according to input data from said transmitting/receiving means, wherein said signal processing means comprises:

operation means for performing a mathematical operation by applying normal distributions to frequencies of detection of the distance and the relative velocity; and target object recognition means for recognizing one or more target objects according to a result of the mathematical operation to which the normal distributions are applied, wherein said operation means is operative to establish a window corresponding to each target object, and obtain frequencies of detection of the distance and the relative velocity correspondingly to each of plural data widths of a probability density on a normal distribution curve, and establish a next window from data representing detected frequencies, and wherein said target object recognition means is operative to recognize target objects, when each of which corresponds to a distance and a relative velocity that are within a same window, as being an identical object, but recognize target objects, when each of which corresponds to a distance and a relative velocity that are not within a same window, as being different objects.

2. The vehicular radar apparatus as set forth in claim 1, which further comprises a scanning mechanism for driving and causing said transmitting/receiving means to scan, wherein said signal processing means is operative to calculate the distance and the relative velocity correspondingly to each detection point which corresponds to a target object within a scanning range to be scanned by using said scanning mechanism.

3. The vehicular radar apparatus as set forth in claim 1, wherein the transmission electromagnetic waves to be transmitted from the transmitting/receiving means are FM-CW waves, wherein the transmitting/receiving means includes a mixer for generating a beat signal according to the transmission electromagnetic wave and the reception electromagnetic wave, and wherein said signal processing means is operative to calculate the distance and the relative velocity according to the beat signal.

4. The vehicular radar apparatus as set forth in claim 1, wherein said operation means provided in said signal processing means is operative to set a data width corresponding to resolution of each of the distance and the relative velocity as a window width, and to calculate a mean value and a standard deviation, which correspond to a normal distribution curve, according to a histogram of a detection frequency corresponding to each data width, and to set a data width in a variable manner according to the mean value and the standard deviation.

5. The vehicular radar apparatus as set forth in one of claims 1 to 4, which further comprises a control unit for causing the vehicle to follow said target object, wherein said control unit causes the vehicle in response to a result of recognition, which is made by said target object recognition means provided in the signal processing means, to follow the target object.

6. The vehicular radar apparatus as set forth in claim 1, wherein said target object recognition means is operative to recognize a preceding vehicle from said target object.

* * * * *